US008223396B2

(12) United States Patent
Kishimoto (10) Patent No.: US 8,223,396 B2
(45) Date of Patent: Jul. 17, 2012

(54) COLOR CONVERSION DEVICE FOR APPLYING CLIPPING TO COLOR VALUES OUTSIDE A COLOR REPRODUCTION RANGE AND WHICH SATISFY A PREDETERMINED CONDITION

(75) Inventor: Yasunari Kishimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1396 days.

(21) Appl. No.: 11/878,101

(22) Filed: Jul. 20, 2007

(65) Prior Publication Data

US 2008/0112025 A1 May 15, 2008

(30) Foreign Application Priority Data

Nov. 13, 2006 (JP) .................................. 2006-307082

(51) Int. Cl.
*G06F 15/00* (2006.01)
(52) U.S. Cl. ......... 358/1.9; 358/518; 358/519; 358/520; 358/521; 358/522; 358/523; 382/167; 345/589; 345/590
(58) Field of Classification Search .................... 358/1.9, 358/518–523; 382/167; 345/589–604
See application file for complete search history.

(56) References Cited

U.S. PATENT DOCUMENTS

| 5,754,184 | A * | 5/1998 | Ring et al. ..................... 345/604 |
| 7,663,641 | B2 * | 2/2010 | Sloan ............................. 345/590 |
| 2004/0061881 | A1 * | 4/2004 | Shimizu et al. ................ 358/1.9 |
| 2005/0206926 | A1 * | 9/2005 | Tsuji .............................. 358/1.9 |
| 2006/0055949 | A1 * | 3/2006 | Mayer et al. ................... 358/1.9 |
| 2007/0097389 | A1 * | 5/2007 | Morovic ......................... 358/1.9 |
| 2008/0130023 | A1 * | 6/2008 | Perez et al. .................... 358/1.9 |
| 2008/0259092 | A1 * | 10/2008 | Hayward ....................... 345/604 |

FOREIGN PATENT DOCUMENTS

| JP | 9-205557 | 8/1997 |
| JP | 2000-134490 | 5/2000 |
| JP | 2001-028694 | 1/2001 |
| JP | 3171081 B2 | 3/2001 |
| JP | 2002-152535 | 5/2002 |
| JP | 2004-032140 | 1/2004 |

OTHER PUBLICATIONS

Japanese Office Action dated Jun. 21, 2011.

* cited by examiner

*Primary Examiner* — Benjamin O Dulaney
(74) *Attorney, Agent, or Firm* — Morgan, Lewis & Bockius LLP (57) ABSTRACT

A color processing device includes a color range conversion component, a control component and a color conversion and clipping component. The color range conversion component performs a color range conversion of input color signals in accordance with a specified color range conversion condition. The control component excludes from objects of the color range conversion by the color range conversion component a color value, of the input color signals, of which a position in a predetermined color space is outside a color reproduction range and which satisfies a predetermined condition. The color conversion and clipping component, after a color space conversion, applies clipping to a color value that falls outside the color reproduction range of the designated device in the color space dependent on the designated device, including rounding off such that the color value falls in the color reproduction range.

12 Claims, 8 Drawing Sheets

FLOW OF PROCESSING IN FIRST/FOURTH COLOR CONVERSION

CASE OF FINDING OUTPUT COLOR VALUE BY APPLYING CONVERSION RULE FOR COLOR RANGE CONVERSION CONDITION SPECIFICATION

LARGE POSSIBILITY OF GRADATION GAP OCCURRING
(AND POSSIBILITY OF GRADATION INVERSION OCCURRING)

FIG. 8B

CASE OF FINDING OUTPUT COLOR VALUE BY CLIPPING

NO POSSIBILITY OF GRADATION GAP OCCURRING
(AND LOW POSSIBILITY OF GRADATION INVERSION OCCURRING)

COLOR CONVERSION DEVICE FOR APPLYING CLIPPING TO COLOR VALUES OUTSIDE A COLOR REPRODUCTION RANGE AND WHICH SATISFY A PREDETERMINED CONDITION

CROSS-REFERENCE TO RELATED APPLICATION

This application claims priority under 35 USC 119 from Japanese Patent Application No. 2006-307082, filed Nov. 13, 2006.

BACKGROUND

1. Technical Field

The present invention relates to a color processing device, a color processing method and a storage medium storing a color processing program, and more specifically relates to a color processing device and method provided with a color range conversion component that specifies color range conversion conditions and performs a conversion of input color signals such that a color range of the input color signals falls into a color reproduction range of a designated device in a predetermined color space which is independent of the designated device, and to a storage medium that stores a color processing program for causing a computer to function as the color processing device.

2. Related Art

Color ranges that are reproducible by image output devices such as color printers, displays and the like and color ranges that are acceptable for image input devices such as scanners and the like differ with types and models of the devices. For example, when printing an image displayed at a display with a color printer or the like, if color signals that have been used for display of the image at the display are outputted to the color printer as is, colors of the images that are reproduced by the two devices will be remarkably different, due to differences between the color ranges of the two devices and suchlike. Technologies have been proposed from heretofore for ameliorating such color reproduction differences by performing a color range conversion (also known as gamut mapping), to replace colors of output object color signals with colors in a color range of a color signal output object device, in a device-independent color space which is not dependent on particular devices (for example, in a uniform-perception color space such as the L*a*b* color space advocated by the CIE (Commission International de l'Eclairage (International Commission on Illumination)), a tristimulus XYZ color system color space or the like, or in a color appearance model color space such as CIECAM02 (Color Appearance Model 2002), or the like).

Specification of conversion conditions for the color range conversion can be realized by, for example, using a predetermined conversion rule (also known as a mapping rule) to convert an input color value to an arbitrary color value (output color value) in an output color range (a color reproduction range in the device-independent color space for an output side device) and associating the input color value with the output color value, and performing this for each of individual input color values, which are color values located in an input color range (a color reproduction range of an input side device in the device-independent color space). As the above-mentioned conversion rule, various rules have been proposed heretofore.

SUMMARY

According to an aspect of the invention, there is provided a color processing device that includes a color range conversion component, a control component and a color conversion and clipping component. The color range conversion component, on the basis of color reproduction range information representing a color reproduction range of a designated device in a predetermined color space which is not dependent on the designated device, uses a predetermined conversion rule to specify a color range conversion condition for converting a color range of input color signals in the predetermined color space such that the color range of the input color signals will fall in the color reproduction range, and performs a color range conversion of the input color signals in accordance with the specified color range conversion condition. The control component excludes from objects of the color range conversion by the color range conversion component a color value, of the input color signals, of which a position in the predetermined color space is outside the color reproduction range and which satisfies a predetermined condition. The color conversion and clipping component performs a conversion, into a color space which is dependent on the designated device, of color signals that have been subjected to the color range conversion by the color range conversion component and, after the color space conversion, applies clipping to a color value that falls outside the color reproduction range of the designated device in the color space dependent on the designated device, including rounding off such that the color value falls in the color reproduction range.

BRIEF DESCRIPTION OF THE DRAWINGS

An exemplary embodiment of the present invention will be described in detail based on the following figures, wherein.

DETAILED DESCRIPTION

Figure 1:
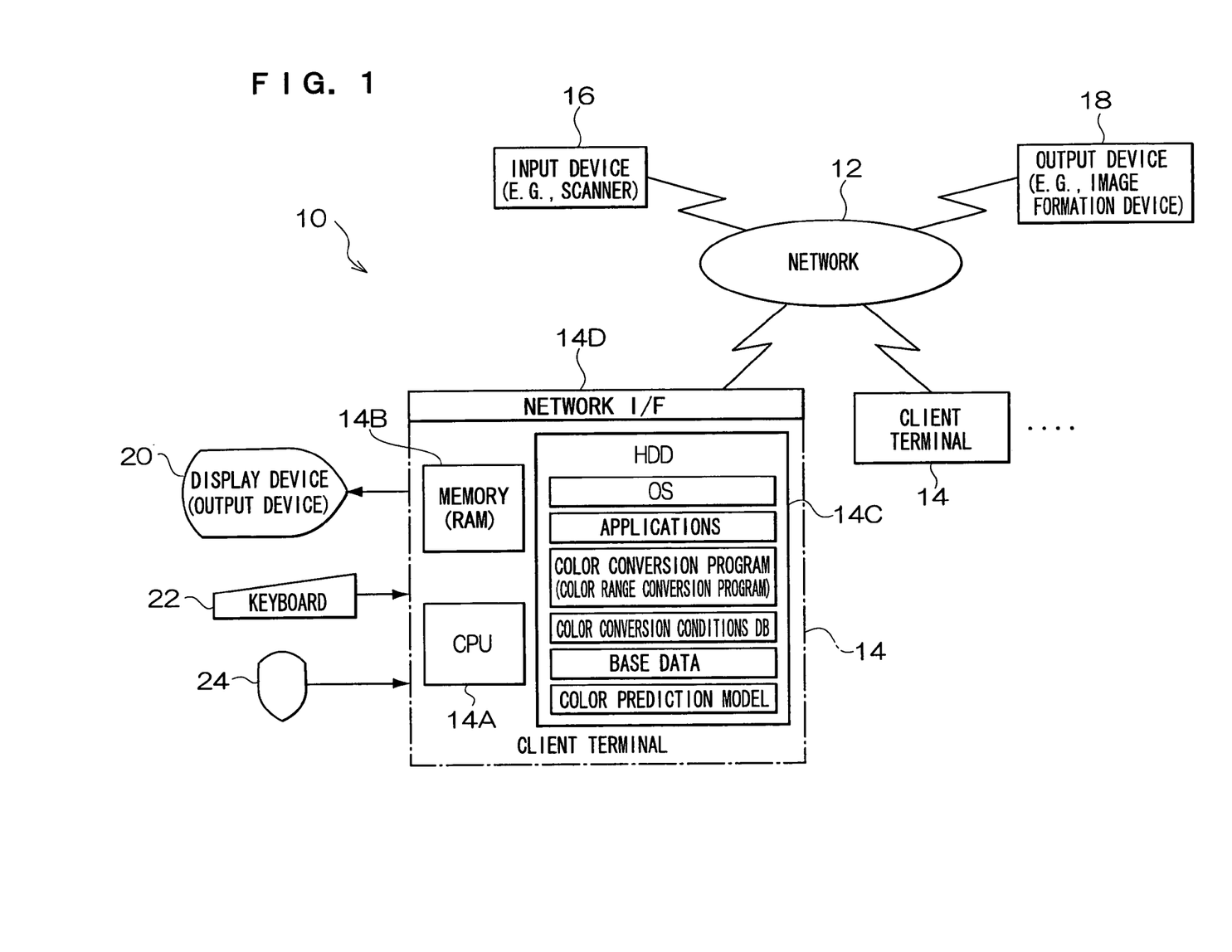
FIG. 1 is a block diagram showing schematic structure of a computer system relating to an exemplary embodiment of the present invention.

Herebelow, an example of an exemplary embodiment of the present invention will be described in detail with reference to the drawings. FIG. 1 shows schematic structure of a computer system 10 relating to the exemplary embodiment. The computer system 10 is structured with a number of client terminals 14, an input device 16 and an output device 18 being respectively connected to a network 12. The network 12 is constituted by a LAN or the like. The client terminals 14 are constituted by PCs (personal computers) or the like. The input device 16 inputs (data of) an image to the computer system 10. The output device 18 renders color signals inputted thereto from the computer system 10 visible as an image. In this example, the input device 16 is, for example, a scanner which outputs color signals by reading an original, and the output device 18 is, for example, an image formation device which prints an image represented by color signals inputted thereto onto paper (a printer, or a multifunction device which features functions of a photocopier, a fax machine and the like in addition to printer functions). The network 12 may also be connected to a computer network such as the Internet or the like.

Each client terminal 14 connected to the network 12 is equipped with a CPU 14A, memory 14B constituted with RAM and the like, an HDD (hard disk drive) 14C and a network interface (I/F) 14D. The client terminal 14 is connected to the network 12 via the network I/F 14D. The client terminal 14 is also connected to a display device 20, which is one output device, and a keyboard 22 and a mouse 24, which serve as an input component. The input device 16, which is a scanner or the like, and the output device 18, which is an image formation device or the like, may be directly connected to the client terminal 14, similarly to the display device 20. As an example, a digital still camera or the like may serve as the input device 16 instead of a scanner, the digital still camera or the like being directly connected to the client terminal 14.

An OS (operating system) program, various application programs, which operate within the OS and utilize the input device 16, the output device 18 and the like, and a color conversion program, for implementing color conversion processing to be described below at the client terminal 14, are pre-installed at the HDD 14C of the client terminal 14. A color conversion condition database, in which color conversion conditions such as profiles and the like to be used for color conversion processing can be registered, is also memorized at the HDD 14C, and a color prediction model and base data are memorized at the HDD 14C.

In a system which generates a color profile (a color lookup table or the like) principally for handling color signals and performs color conversion processing of digital image signals using the generated color profile, this exemplary embodiment relates to color range conversion at a time of color profile creation. The color profile herein has coefficients for performing color conversion processing. A storage format of these coefficients may be based on the ICC (International Color Consortium) and may be another storage format, and is not particularly limited.

Figure 2:
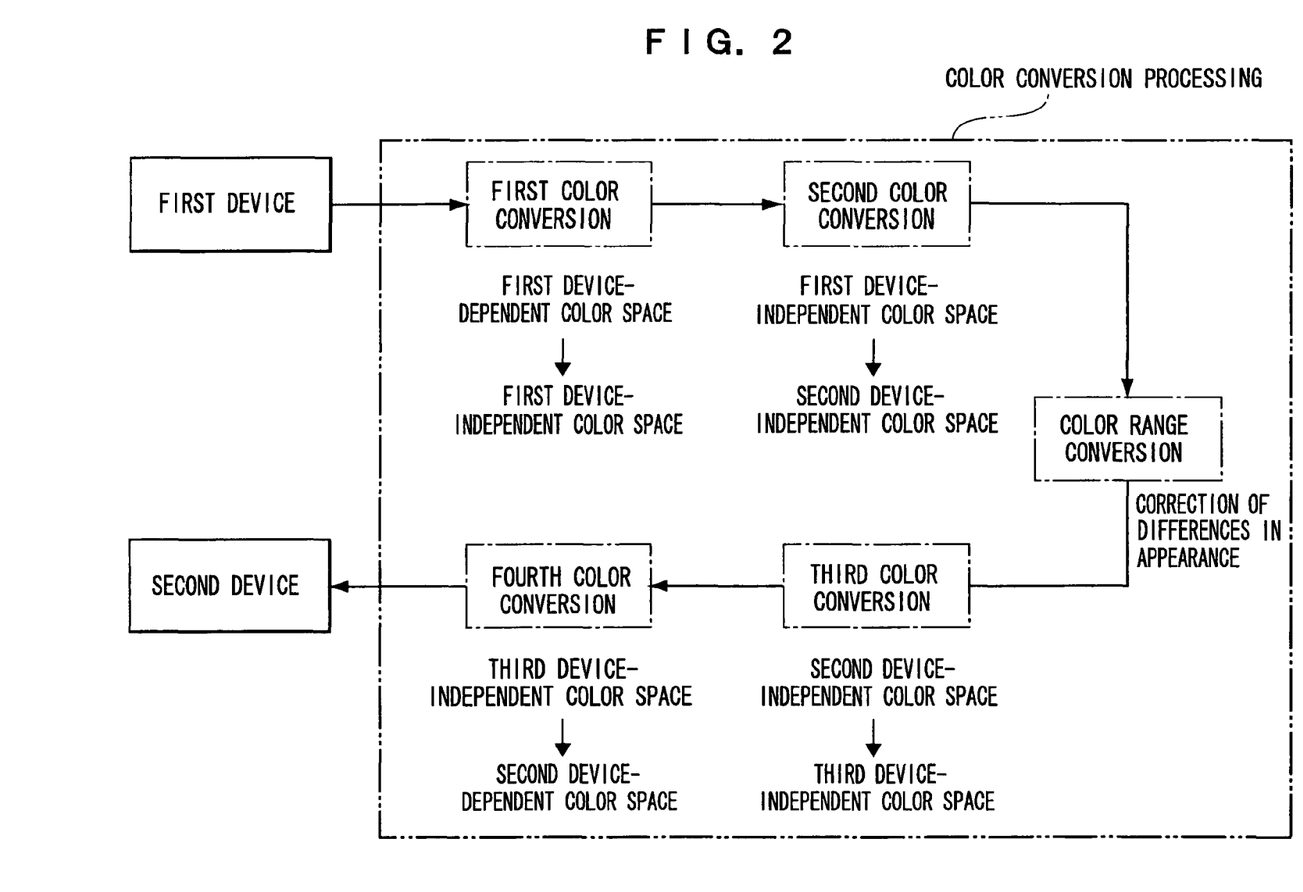
FIG. 2 is a schematic diagram showing a flow of color conversion processing in the exemplary embodiment of the present invention.

Next, operation of this exemplary embodiment will be described. In the client terminal 14 relating to this exemplary embodiment, if image data inputted from one of the input devices 16 or image data that has been used for output of an image at one of the output devices 18 is to be used for output of the image at another device (another of the output devices 18), color conversion processing for reproduction at the different device or for correcting differences in appearances of colors of the subject image is carried out (see FIG. 2). In FIG. 2, the input device 16 that inputted the image data or the output device 18 that previously performed output of the image is shown labeled as a first device, and the output device 18 that is to subsequently perform output of the image (the image data output object output device 18) is shown labeled as a second device.

As shown in FIG. 2, the color conversion processing relating to this exemplary embodiment is constituted by respective processings of a first color conversion, a second color conversion, a color range conversion, a third color conversion and a fourth color conversion. Color signals that have been inputted to the client terminal 14 from the first device or that have been used for output of the image at the first device are color signals in which individual image colors of the color signals are represented by color values in a color space dependent on the first device (the first device-dependent color space is, for example, the RGB color space if the first device is a scanner, a digital still camera, the display device 20 or the like). In the color conversion processing relating to this exemplary embodiment, the first color conversion is applied to these color signals to convert the color values in the first device-dependent color space to color values in a color space independent of particular color devices (i.e., a color space independent of the first device). Herebelow, the L*a*b* color space, XYZ color space or the like is suitable as the first device-independent color space.

Next, the second color conversion is applied to the color signals that have been subjected to the first color conversion. The second color conversion converts the color values in the first device-independent color space to color values in a color space suitable for color range conversion (a second device-independent color space), which is not dependent on a particular device (apparatus). As the second device-independent color space, a color space that represents appearances of colors without regard to the effects of observation conditions is suitable. In this exemplary embodiment, a Jab color space obtained from the JCh color space defined by CIECAM02, which is a color appearance model, is employed as the second device-independent color space. Color attribute values a and b of the Jab color space correspond to ac and bc values generated from the color attribute values C and h of the JCh color space, and are characterized in that hue and saturation are mutually convertible. Rather than a CIECAM02 color appearance model, a CIECAM97s color appearance model or the like may be utilized.

Then, the color range conversion (referred to as gamut mapping) is applied to the color signals that have been subjected to the second color conversion. The color range conversion corrects for differences between appearance of the image at the first device and appearance of the image at the second device (which differences in appearance are caused by differences between the color ranges of the first device and the second device). The color range conversion relating to this exemplary embodiment will be described in detail later.

Next, the third color conversion is applied to the color signals that have been subjected to the color range conversion. The third color conversion converts the color values in the second device-independent color space to color values in another color space which is not dependent on a particular device (a third device-independent color space, e.g., the L*a*b* color space). Then, the fourth color conversion is applied to the color signals that have been subjected to the third color conversion. The fourth color conversion converts the color values in the third device-independent color space to color values in a color space dependent on the second device (a second device-dependent color space, e.g., the RGB color space if the second device is the display device 20 or the CMYK color space if the second device is an image formation device). The color signals provided by the above-described color conversion processing structured by the respective processings are outputted to the second device and provided for output of the image at the second device. Thus, appearances of colors in the image outputted by the second device can be made to match the first device.

Programs for performing the respective processings structuring the above-described color conversion processing (i.e., a first color conversion program for performing the first color conversion, a second color conversion program for performing the second color conversion, a color range conversion program for performing the color range conversion, a third color conversion program for performing the third color conversion and a fourth color conversion program for performing the fourth color conversion) are respectively added to the color conversion program installed at the HDD 14C of the client terminal 14. The above described color conversion processing calls the first color conversion program, the second color conversion program, the color range conversion program, the third color conversion program and the fourth color conversion program appended to the color conversion program, in this order, and is implemented by performing these processings in this order. In FIG. 1, the color conversion program is shown separately from the OS program, but the color conversion program could be included in the OS program as a standard program of the OS. The above-described color conversion program corresponds to a color processing program relating to the present invention.

In the above-described color conversion processing, the second color conversion and the third color conversion are formularized, and the color conversions are implemented simply by substituting input color values into color conversion equations and calculating output values therefrom. However, for the first color conversion, the fourth color conversion and the color range conversion, it is necessary to generate color conversion conditions and carry out conversions in accordance with requirements. Below, details of the first color conversion and the fourth color conversion will be described first.

Figure 3:
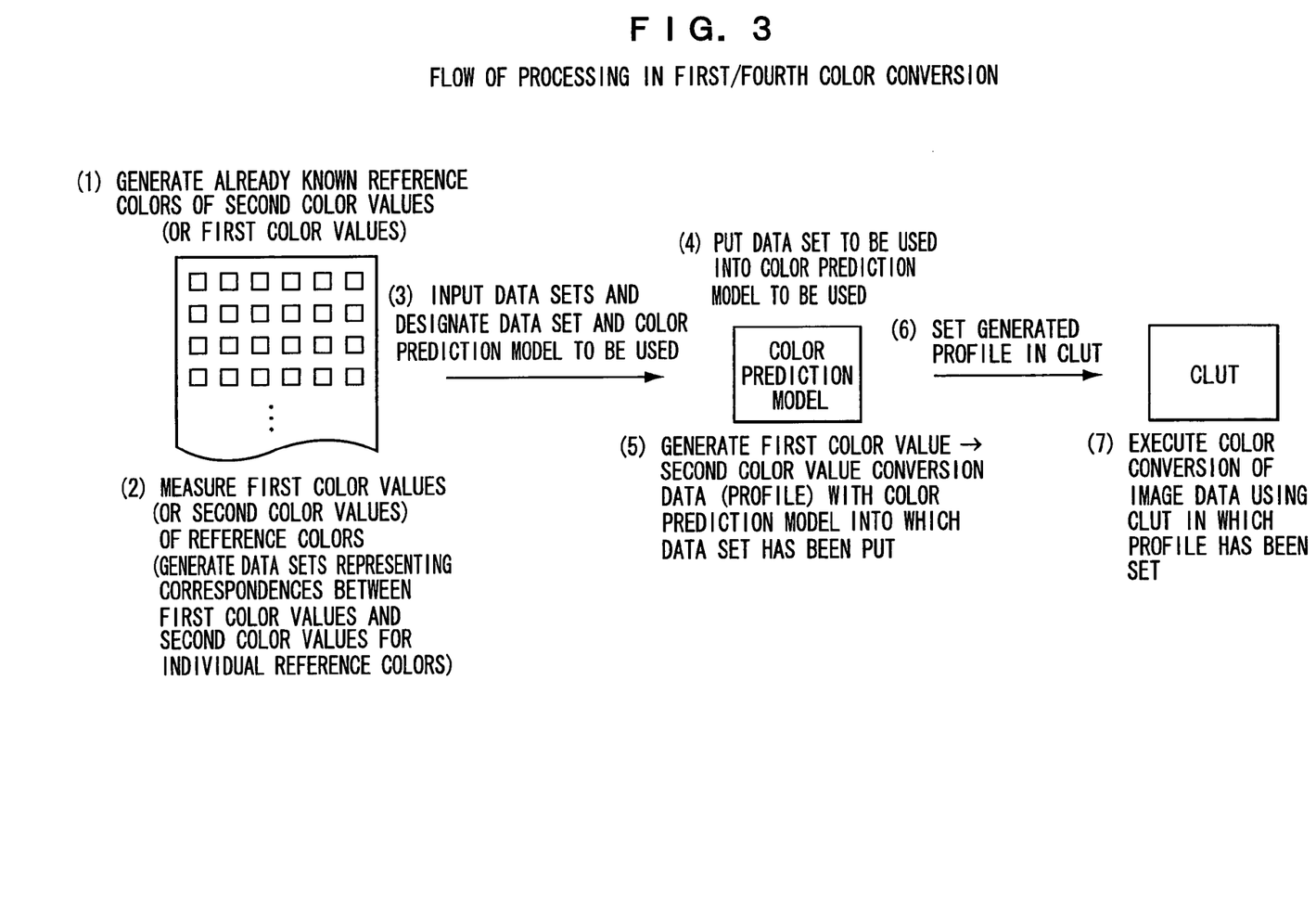
FIG. 3 is a schematic diagram showing a flow of a first or fourth color conversion in the color conversion processing.

For the first color conversion or the fourth color conversion, conversion data for converting input color values to output color values (a profile) is established in a CLUT (color lookup table). The first color conversion or fourth color conversion is implemented by sequentially inputting conversion object color signals (color signals representing colors of respective pixels by input color values) into the CLUT. Now, as a method for generation of a profile, a method is known in which, as shown by (1) in FIG. 3, patches of already known colors (reference colors) are generated for one of input color values and output color values. (For example, if generating a profile for the fourth color conversion in a case of outputting the color signals to an image formation device serving as the second device, the generation of reference colors is implemented by output color values causing the known reference colors to be printed by the printer; and if generating a profile for the fourth color conversion in a case of outputting the color signals to a display serving as the second device, the generation of reference colors is implemented by output color values causing the known reference colors to be displayed at the display.) For the generated reference colors, color values of the unknown one of input color values and output color values are respectively measured with a colorimeter or the like. Thus, data in which input color values and output color values are associated for the respective reference colors is obtained, and this data is utilized as the profile.

However, for forming a very large number of reference colors (a number the same as a number of grid points in the CLUT), it is necessary to measure input color values and output color values for a very large number of colors. Therefore, there is a problem in that generation of a profile takes a great deal of time. Accordingly, methods using color prediction models have been utilized as other models for generation of profiles. A color prediction model is a program which, on the basis of base data representing a relatively small number of correspondences between input color values and output color values, is inputted with corresponding input color values for unknown output color values, calculates estimates of output color values that correspond to the inputted input color values by any of various algorithms, and outputs the estimated output color values. In the generation of a profile using a color prediction model, reference colors (reference colors of which the input color value or output color value is already known), which are smaller in number than in a case of generating a profile directly from reference colors, are generated (see (1) in FIG. 3), the unknowns of the input color values and the output color values are measured for the generated reference colors, and thus base data associating input color values with output color values of the reference colors is generated (see (2) in FIG. 3). Then, this base data is put into the color prediction model (see (4) in FIG. 3), input color values are sequentially inputted into the color prediction model, output color values that are sequentially outputted from the color prediction model are associated with the inputted input color values, and a profile is generated (see (5) in FIG. 3). Then, the generated profile is set into the CLUT (see (6) in FIG. 3), and a color conversion (the first color conversion or the fourth color conversion) can be implemented with this CLUT.

With the generation of a profile using a color prediction model, because the required number of reference colors can be greatly reduced in comparison with a case of generating a profile directly from reference colors, the time for profile generation can be greatly reduced. In this exemplary embodiment, as a method for generation of conversion conditions (i.e., a profile) for the first color conversion or the fourth color conversion, either of the two kinds of generation method described above may be used, but the use of a generation method that utilizes base data and a color prediction model is desirable. Anyway, in the fourth color conversion, for color values which fall outside a certain range of numerical values corresponding to a color reproduction range of the second device in the second device-dependent color space (for example, if the second device-dependent color space is the CMYK color space, a range of each of C, M, Y and K from 0 to 100 or from 0 to 255) after the fourth color conversion, clipping, which rounds down such that the color values will fall within the certain range of numerical values, is applied to these color values.

Next, the color range conversion processing relating to this exemplary embodiment will be described with reference to FIG. 4. This color range conversion processing is realized by execution of the color range conversion program by the CPU 14A of the client terminal 14.

Figure 5A:
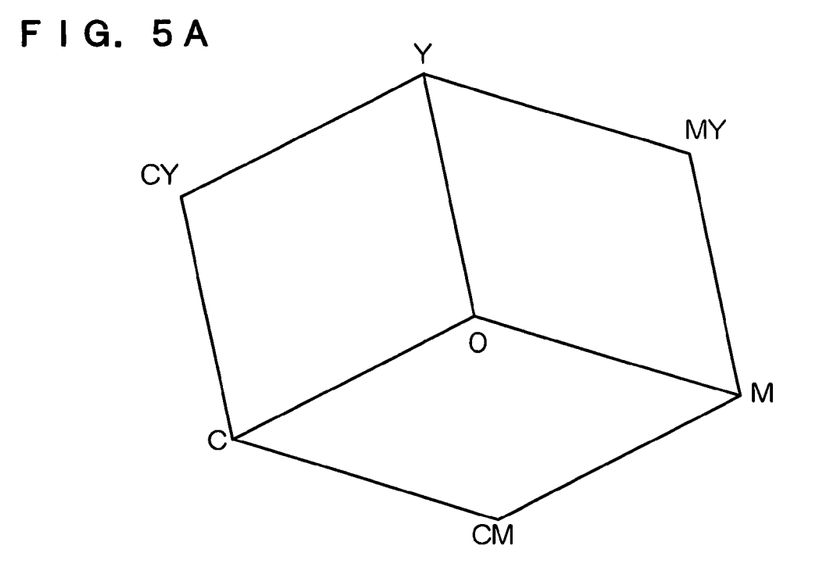
FIG. 5A and FIG. 5B are schematic diagrams showing an example of a color range outer border of a second device in a color space which is dependent on the second device.
Figure 5B:
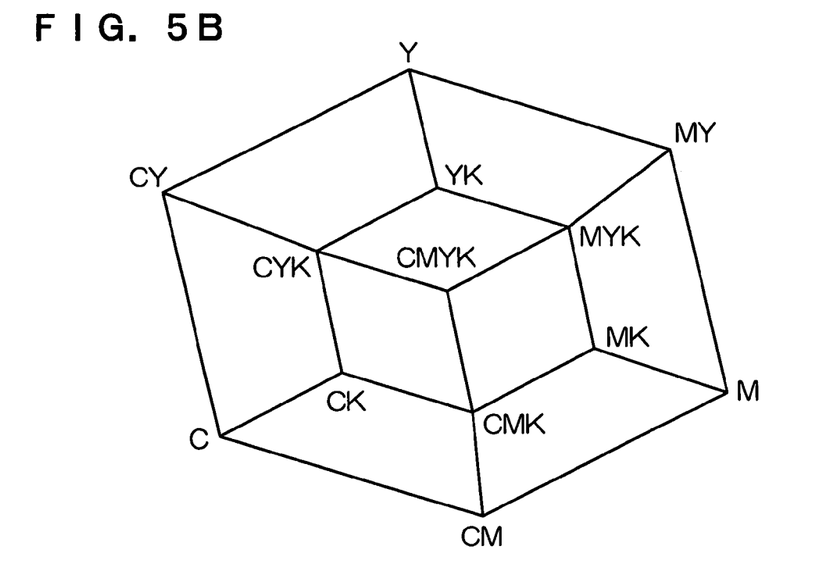

In step 50, points structuring an outer border (i.e., points on an outer border surface) of the color range of the second device in the second device-dependent color space (i.e., an outer limit of the color reproduction range) are extracted to serve as an outer border point group. For example, for a case in which the second device is an image formation device, a color range outer border of the image formation device in the color space dependent on the image formation device (the CMYK color space) is shown by the example in FIGS. 5A and 5B. FIG. 5A shows an upper side portion of the color range outer border in the CMYK color space and FIG. 5B shows a lower side portion of the same. The whole of the color range outer border of the image formation device in the CMYK color space is a twelve-faced polyhedron in which the solids shown in FIG. 5A and FIG. 5B are combined. In step 50, points of arbitrary locations on the second device color range outer border surface can be extracted to serve as the outer border point group, but it is desirable to extract at least points corresponding to vertices of the color range outer border and points corresponding to edges that join the vertices of the color range outer border. The extracted outer border points along the edges and/or points that are on faces rather than at the vertices and the edges may have constant spacings, and may have non-constant spacings.

Figure 6:
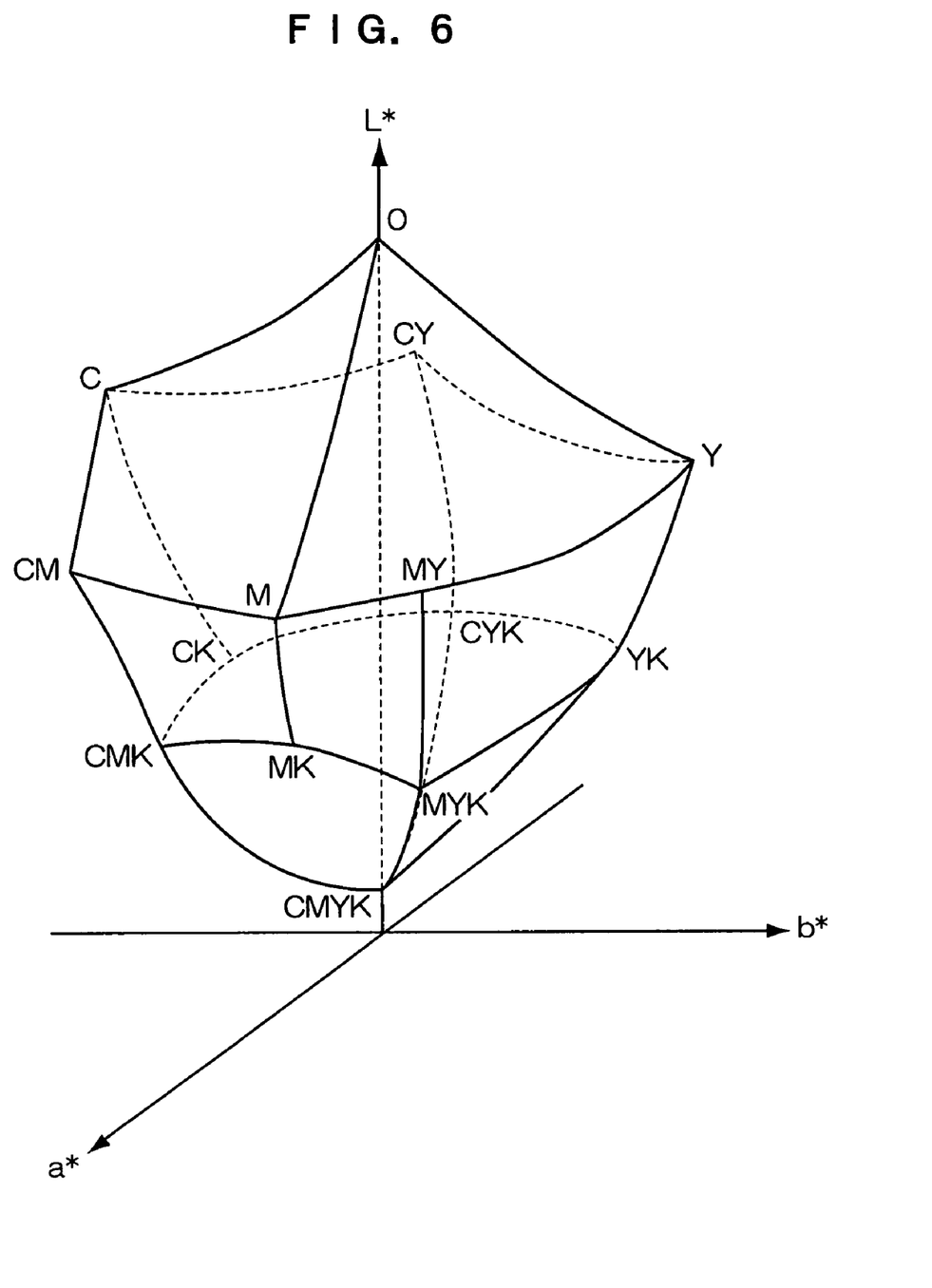
FIG. 6 is a schematic diagram showing the example of the color range outer border (output color range) of the second device in a device-independent color space.

In step 52, color values of the outer border point group extracted in step 50 (the outer border point group representing the second device color range outer border in the second device-dependent color space) are first converted to color values in the third device-independent color space (i.e., a reverse conversion of the fourth color conversion (see FIG. 2) is performed), and then are converted to Jab color values in the second device-independent color space (a reverse conversion of the third color conversion (see FIG. 2) is performed). Thus, an outer border point group representing the outer border of the color range of the second device in the second device-independent color space (an output color range) is found. An example of the color range outer border structured by the outer border point group that has been subjected to the conversions of step 52 (i.e., the second device color range outer border in the second device-independent color space) is shown in FIG. 6. In FIG. 6, the vertices of the color range outer border are shown with the same reference symbols assigned as for the corresponding vertices of the color range outer border shown in FIG. 5A and FIG. 5B. By the above processing, an outer border point group which structures the second device color range outer border in the second device-independent color space can be obtained.

Next, in step 54, polygons are formed (a polyhedron is formed) by joining the vertices of the outer border point group provided by the conversions of step 52 and interpolating or the like to generate outer border faces. Thus, outer border information representing the second device color range outer border in the second device-independent color space is generated. Hence, on the basis of the generated outer border information, it is simple to utilize the second device color range outer border in the second device-independent color space for various applications, such as, for example, evaluating and quantifying the second device color range outer border in the second device-independent color space, using general-purpose visualization tools to three-dimensionally visualize the second device color range outer border in the second device-independent color space, and the like.

When the output color range outer border information is being generated in step 54, outer border points of the outer border point group provided by the conversions of step 52 may be, for example, selectively extracted as suitable to an intended application and the outer border information generated by joining only the extracted selection of the outer border point group and generating the outer border faces by interpolation thereof or the like. Further, the output color range outer border information may be pre-emptively generated and memorized at the HDD 14C, and the output color range outer border information acquired simply by reading this information. The above-described output color range outer border information corresponds to color reproduction range information relating to the present invention.

Next, in step 56, input color range outer border information which represents an outer border of the color range of the first device (an input color range outer border) in the second device-independent color space (see FIG. 2) is acquired. The input color range outer border information can be generated by, for example, similarly to steps 50 to 54 described above: extracting an outer border point group which structures the color range outer border of the first device in the first device-dependent color space; converting the color values of the extracted outer border point group to color values in the second device-independent color space and thus obtaining an outer border point group representing the first device color range outer border in the second device-independent color space; and forming polygons (a polyhedron) by joining vertices of the outer border point group that has been obtained and interpolating or the like to generate outer border faces. Further, the input color range outer border information may be pre-emptively generated and memorized at the HDD 14C, and acquired simply by reading this information.

Next, from step 58 onward, processing to generate conversion conditions for color range conversion (color range conversion conditions) is carried out on the basis of the input color range outer border information and the output color range outer border information. Firstly, in step 58, data of numerous points which are located at mutually different positions in the input color range in the second device-independent color space is generated on the basis of the input color range outer border information obtained in step 56, to serve as an input data group. Then, in step 60, a single input data item (input color value) is taken from the input data group for color conversion condition generation has been generated in step 58. Then, in step 62, it is judged whether or not the input color value taken in step 60 is a color value within a predetermined range of hues. Here, as the predetermined hue range, a hue range can be employed which corresponds to a hue range in which, at the outer border of the output color range in the second device-independent color space, a region is formed at which an angular difference θ between the outer border surface of the output color range and a direction perpendicular to the brightness axis of the second device-independent color space is less than or equal to a predetermined value (see FIG. 8A and FIG. 8B), which is to say, a hue range at which it is possible that a gap in gradations, an inversion of gradations or the like would be caused by the color range conversion. Specifically, it is possible to employ, for example, a hue range corresponding to Y, a hue range corresponding to C to B or the like.

Figure 7:
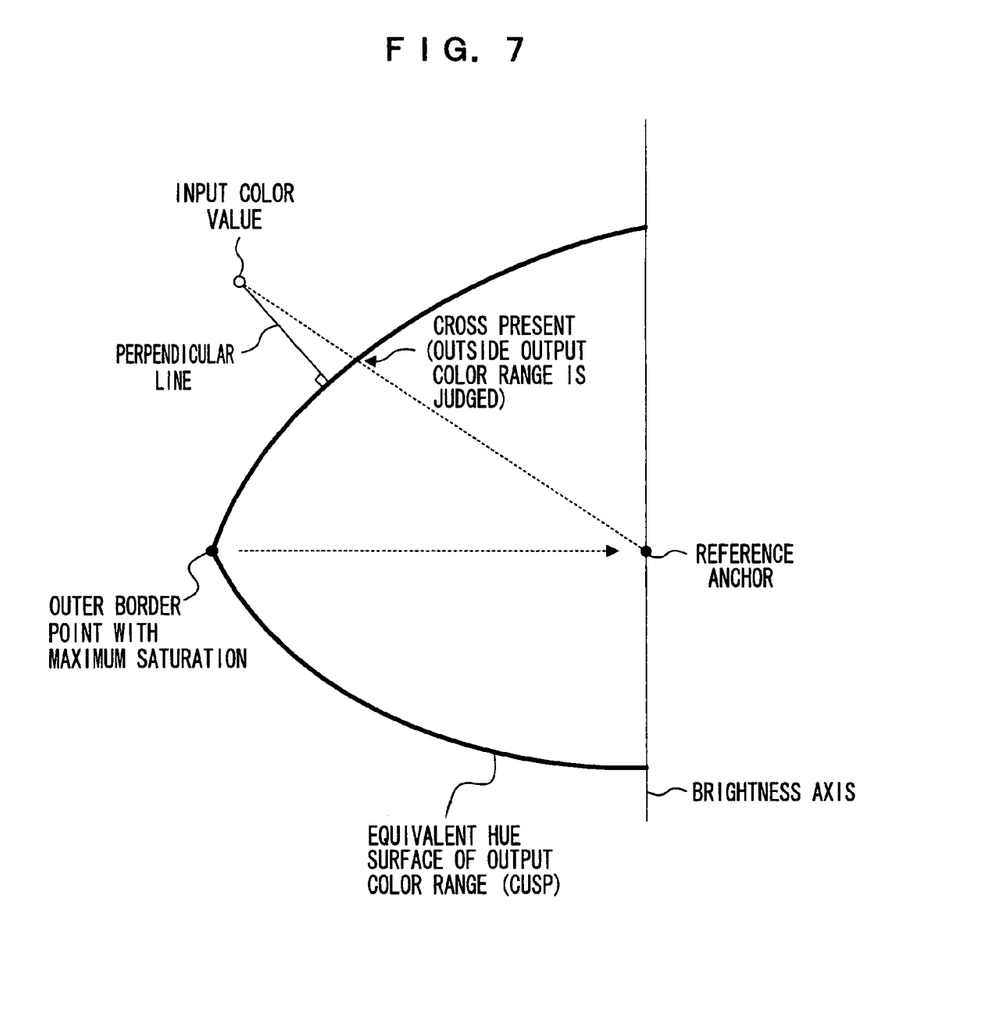
FIG. 7 is a schematic diagram for explaining an example of inside/outside judgment of an input color value and judging whether or not the input color value is to be excluded from color range conversion objects.

If the judgment of step 62 is positive, the processing advances to step 64, and it is judged whether or not the input color value taken in step 60 is located outside the output color range in the second device-independent color space. This judgment can be performed by, for example, as shown in FIG. 7: extracting an equivalent hue surface (referred to as a cusp) of the output color range that includes the input color value, on the basis of the output color region outer border information; determining an outer border point with maximum saturation in the extracted equivalent hue surface; specifying a color value that has brightness equal to this outer border point and is on the brightness axis to serve as a reference anchor; and determining whether or not a straight line joining the input color value with the reference anchor intersects the outer border of the output color range. It is also possible to use a judgment method other than this method for the judgment of whether or not the input color value is located in the output color region.

If the judgment of step 62 or step 64 is negative, it can be judged that there is no possibility of the input color value being converted to a color value that will give rise to a gap in gradations, an inversion of gradations or the like consequent to the color range conversion. Therefore, the processing advances to step 72. The input color value taken in step 60 is converted, using a predetermined conversion rule for generating color range conversion conditions, such that a position thereof in the second device-independent color space is within the output color range outer border represented by the output color range outer border information. Thus, an output color value for conversion condition generation is found, and the processing advances to step 74.

As the above-mentioned conversion rule, it is possible to utilize widely known conversion rules for color range conversion (gamut mapping). For example, it is possible to utilize: a pasting-type conversion rule which, for input color values located in regions of the input color range that overlap with the output color range, uses the input color values as output color values without alteration (i.e., the input color values and output color values calorimetrically coincide), and for input color values located in regions of the input color range that do not overlap with the output color range, performs color conversion to obtain output color values such that the output color values fall in the output color range; a compression/expansion-type conversion rule which performs color conversions of all the input color values to obtain output color values so as to preserve relative relationships between the points in the input color range; or the like. Among pasting-type conversion rules, there are processes which project color values outside the output color region onto the outer border of the output color region without altering hues or brightnesses thereof so as to preserve brightnesses, processes which project color values outside the output color region onto the outer border of the output color region without altering hues in order to preserve saturations, and the like, and any of these may be used. In compression/expansion-type conversion rules, there are processes which perform color range conversions such that gradations are preserved, and these may be used. Furthermore, an adaptive-type conversion rule which employs different conversion processes for different regions may be used; for example, a conversion rule in which pasting and compression/expansion are combined may be used.

On the other hand, if the judgments of step 62 and step 64 are both positive, there is a possibility that the input color value would be converted to a color value which gives rise to a gradation gap, a gradation inversion or the like consequent to the color range conversion. Accordingly, in step 66, an evaluation value representing a distance between the input color value and the output color range outer border is calculated. As this evaluation value, an evaluation value representing the length of a line which is perpendicular to the output color range outer border, the perpendicular line being drawn from the input color value as shown in FIG. 7, may be utilized (i.e., a minimum distance between the input color value and the output color range outer border surface). Rather than this, it is possible to find a position of the outer border surface of the output color range at which a color difference from the input color value is minimal and utilize an evaluation value representing a distance between the minimum color difference position and the input color value. It is also possible to find a provisional output color value by applying a conversion rule to the input color value and to use an evaluation value representing a distance between the input color value and the provisional output color value. It is further possible to apply weightings to the evaluation values described above and set a weighted average of these evaluation values as an ultimate evaluation value.

Figure 8A:
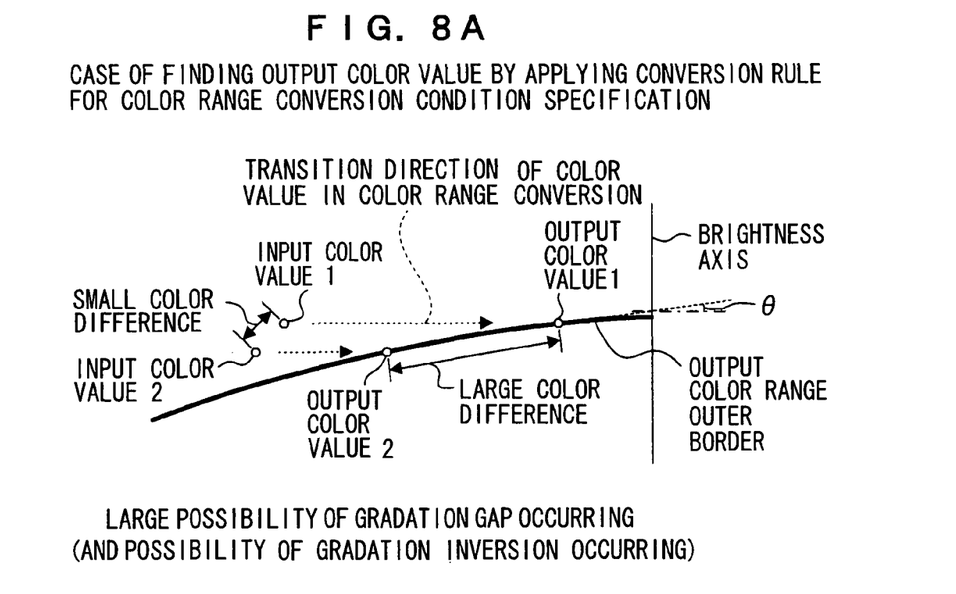
FIG. 8A is a schematic diagram showing a case in which output color values are found using a conversion rule for color range conversion condition specification.
Figure 8B:
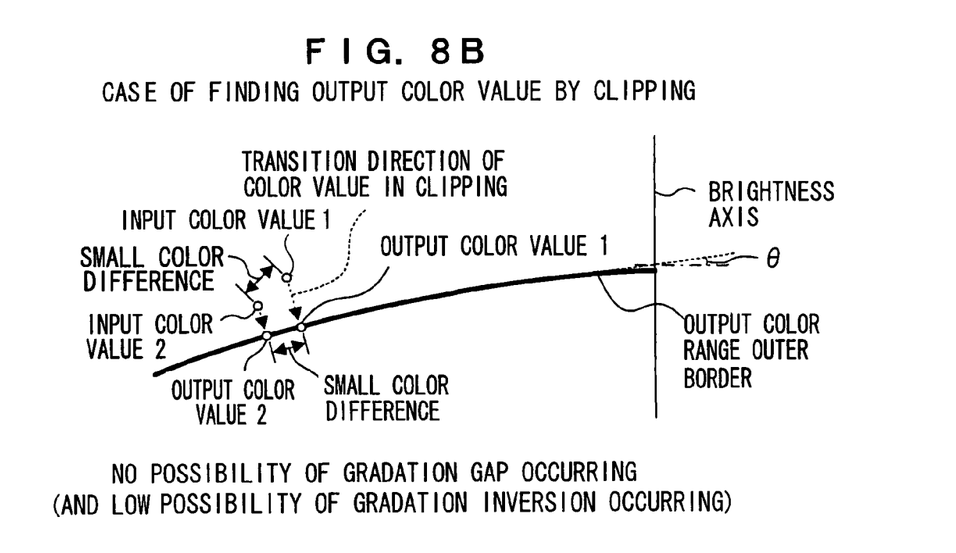
FIG. 8B is a schematic diagram showing a case in which output color values are found by clipping.

Then, in step 68, it is judged whether or not the evaluation value calculated in step 66 is less than or equal to a pre-specified threshold value. If the judgment of step 68 is positive, then, for example, as shown in FIG. 8A, it is possible that the input color value is located in a color region, in the second device-independent color space, in a vicinity of the outer border surface of the output color range at which the outer border surface is inclined at an angle θ from a line perpendicular to the brightness axis which is less than or equal to the predetermined value. In such a case, a direction of transition of the color value in the color range conversion would be close to being parallel to the direction of the outer border surface of the output color range. Hence, as shown in FIG. 8A, an input color value 1 in such a color region would be converted to an output color value 1 through the color range conversion, while an input color value 2 in this color region would be converted to an output color value 2 through the color range conversion. As is clear from comparison of a color difference between the output color values 1 and 2 with a color difference between the input color values 1 and 2 shown in FIG. 8A, the color difference would be greatly increased through the color range conversion. Consequently, it is possible that a gradation gap would arise through the color range conversion.

If a conversion rule is applied to the input color values 1 and 2 shown in FIG. 8A that, for example, projects the color values onto positions on the outer border surface of the output color range between which a color difference is minimal (i.e., sets color values of outer border points between which a color difference of the input color values is minimal as output color values) or the like, it will be possible to avoid the occurrence of a gradation gap. However, when such a conversion rule is employed, it is possible that a gradation inversion may occur (i.e., a magnitude relationship of brightness and/or saturation of the input color values 1 and 2 being inverted in the output color values), depending on the inclination of the output color region outer border surface and the like. Moreover, a conversion rule as described above has a disadvantage in that accurate output color values cannot be obtained for different color regions. Therefore, it would be necessary to switch conversion rules that are applied between color regions, and processing would be greatly complicated.

Therefore, in the color range conversion processing relating to this exemplary embodiment, if the judgment of step 68 is positive, processing advances to step 70, the input color value is specified without alteration as the output color value for conversion condition generation corresponding to that input color value, and then the processing advances to step 74. Thus, when the color range conversion of color signals is performed, the current input color value will not be substantially converted. However, at a time of the fourth color conversion, this color value will be at a value outside the certain range of numerical values after the fourth color conversion. Therefore, the aforementioned clipping will be implemented. Note that step 62 to step 70 correspond to a control component relating to the present invention.

The clipping has the characteristic that, provided a processing object color value (i.e., a color value that falls outside the color reproduction region of the second device in the second device-dependent color space) is a color value in a color region in which distances in the second device-dependent color space from the outer border of the second device color reproduction region are relatively small, the processing object color value is converted to a color value for which a color difference at the outer border of the second device color reproduction region in the second device-dependent color space is substantially minimal. Accordingly, as shown by the examples in FIG. 8A and FIG. 8B, the input color value 1 is converted to the output color value 1 shown in FIG. 8B by clipping and the input color value 2 is converted to the output color value 2 shown in FIG. 8B by clipping. As is clear from a comparison of a color difference between the output color values 1 and 2 shown in FIG. 8B with the color difference between the input color values 1 and 2, when clipping is performed, transitions of color values which fall outside the color reproduction region to inside the color reproduction region can be realized without gradation gaps occurring. Moreover, the probability of a gradation inversion occurring is reduced with clipping.

Now, if the second device is the display device 20 or the like, a significant recess portion which is particularly deeply hollowed out may occur at the outer border of the output color region represented by the output color region outer border information in the second device-independent color space. However, if the above-described clipping is applied to color values that are located outside the output color region in the second device-independent color space and that are in the vicinity of the significant recess portion, gradation gaps and the like can be prevented from occurring. Thus, an effect is provided.

Further, the conversion of processing object color values by clipping, which is carried out at the time of the fourth color conversion, corresponds to extrapolating color conversion conditions of the fourth color conversion and carrying out a conversion in accordance with conversion conditions that are obtained thus. This conversion has the characteristic that the larger a distance in the second device-dependent color space between a processing object color value and the outer border of the second device color reproduction region, the lower the accuracy of the extrapolation, which is to say the lower the accuracy of the conversion, and thus the lower the probability of the processing object color value being converted to a suitable color value by the clipping. Accordingly, if the judgment of step 68 is negative (i.e., if the input color value is a color value with a low probability of being converted to a suitable color value by clipping), the processing advances to step 72 and the conversion rule is applied to the input color value as described earlier to obtain an output color value for conversion condition generation.

An output color value for conversion condition generation (output data) corresponding to the input color value taken in step 60 is determined as described above. Then, in step 74, it is judged whether or not all input data (input color values) has been taken from the input data group generated in the earlier step 58. If this judgment is negative, the processing returns to step 60 and steps 60 to 74 are repeated until the judgment of step 74 is positive.

In this manner, output color values for conversion condition generation (output data) corresponding to all the input data (input color values) of the input data group generated in step 58 are determined, and an output data group for conversion condition generation is generated. For color values that are located in regions outside the output color region and for which distances, from portions of the outer border surface of the output color range in the second device-independent color space that are oriented with angles θ with respect to directions perpendicular to the brightness axis of the second device-independent color space that are less than or equal to the predetermined value, are at or below the threshold value, the judgments of steps 62, 64 and 68 are respectively positive. These input color values are set as output color values for conversion condition generation without alteration and thus are excluded from objects of the color range conversion. Thus, in the color range conversion processing relating to this exemplary embodiment, these regions are treated as marginal regions to be excluded from color range conversion objects.

When the judgment of step 74 is positive, the processing advances to step 76, and the input data group for conversion condition generation that was generated in step 58 and the output data group for conversion condition generation that has been generated by steps 60 to 74 are associated and set into the CLUT to serve as conversion data. In this manner, color range conversion conditions are generated (put into the CLUT). Then, in step 78, the color range conversion is carried out by converting color signals (input data) of an image that is to be outputted by the second device, which have been through the first color conversion and the second color conversion (see FIG. 2), with the CLUT into which the color range conversion conditions have been put in step 76, and color range conversion processing is completed. Note that the above-described steps 50 to 60 and steps 72 to 78 of the color range conversion processing correspond to a color range conversion component relating to the present invention.

The third color conversion and the fourth color conversion (see FIG. 2) are sequentially applied to the color signals which have been through the above-described color range conversion. After the fourth color conversion, clipping for rounding down such that color values fall in a certain range of numerical values, as described earlier, is applied to color signals that have fallen outside the certain range of numerical values corresponding to the second device color reproduction range in the second device-dependent color space (i.e., the color values for which the input color values were set without alteration as the output color values for conversion condition generation in the earlier step 70). Then, the color signals which have been through the fourth color conversion including the clipping are outputted to the second device and are used for output of the image at the second device. Note that the fourth color conversion including the clipping corresponds to a color conversion and clipping component relating to the present invention.

Thus, differences between the appearance of the image at the first device and the appearance of the image at the second device, which are principally caused by differences between the color ranges of the first device and the second device, are corrected for. Moreover, at a color region of the output color range in the second device-independent color space that corresponds to a portion of the outer border surface which is inclined with an angle θ, relative to a direction perpendicular to the brightness axis of the second device-independent color space, that is less than or equal to the predetermined value, the occurrence of a gradation gap is prevented and the probability of a gradation inversion occurring is reduced. Thus, the quality of the image that is outputted by the second device can be improved.

Figure 4:
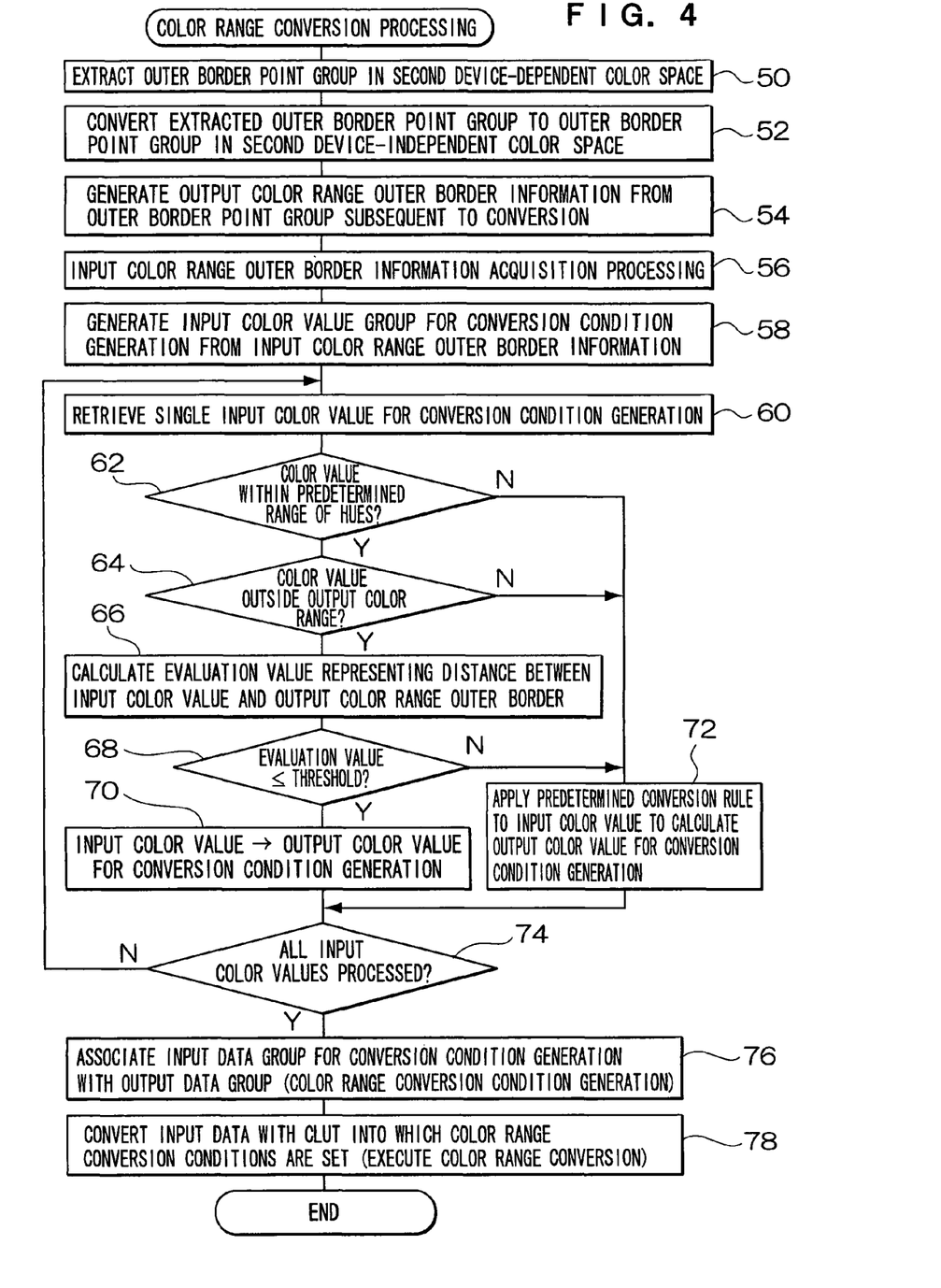
FIG. 4 is a flowchart showing details of color range conversion processing.

Anyway, in the above descriptions, the judgments of steps 62, 64 and 68 in FIG. 4 are respectively applied to individual input color values for conversion condition generation and it is judged whether or not each input color value is to be excluded from the color range conversion objects. However, this is not a limitation. It is also possible to determine a marginal region corresponding to these judgments beforehand and then judge whether or not the individual input color values should be excluded from the color range conversion objects by judging whether or not the individual input color values are in the marginal region.

Furthermore, a mode which judges whether or not an input color value is to be excluded from color range conversion objects by performing the judgments of steps 62, 64 and 68 of FIG. 4 has been described above. However, these conditions for exclusion from color range conversion objects (a predetermined condition relating to the present invention) may be supplemented with a judgment/judgments based on other evaluation values. Such a judgment could be, for example, whether or not a distance ratio D1/D2 of a distance D1, between an output color value that is found using a conversion rule which utilizes a reference anchor and the input color value, and a distance D2, between the input color value and an outer border point at which a color difference from the input color value is minimal, is at or above a threshold, or suchlike.

Furthermore, if the above-mentioned marginal region is employed in determining whether color values are inside or outside a color range (inside/outside judgment) and a judgment object color value is in the marginal region, it may be judged that the judgment object color value is inside the color range or it may be judged that the judgment object color value is outside the color range. Whether to judge color values as being inside the color range or outside the color range may be switched in accordance with user intentions.

Moreover, a mode has been described above in which the color range conversion program corresponding to the color processing program relating to the present invention is pre-memorized (installed) at the HDD 14C of the client terminal 14. However, the color processing program relating to the present invention may be provided in a form which is memorized at a storage medium such as a CD-ROM, a DVD-ROM or the like.

According to a first aspect of the invention, there is provided a color processing device, which is structured to include: a color range conversion component that, on the basis of color reproduction range information representing a color reproduction range of a designated device in a predetermined color space which is not dependent on the designated device, uses a predetermined conversion rule to specify a color range conversion condition for converting a color range of input color signals in the predetermined color space such that the color range of the input color signals will fall in the color reproduction range, and performs a color range conversion of the input color signals in accordance with the specified color range conversion condition; a control component that excludes from objects of the color range conversion by the color range conversion component a color value, of the input color signals, of which a position in the predetermined color space is outside the color reproduction range and which satisfies a predetermined condition; and a color conversion and clipping component that performs a conversion, into a color space which is dependent on the designated device, of color signals that have been subjected to the color range conversion by the color range conversion component and, after the color space conversion, applies clipping to a color value that falls outside the color reproduction range of the designated device in the color space dependent on the designated device, including rounding off such that the color value falls in the color reproduction range.

What is claimed is:

1. A color processing device comprising:
   a color range conversion component that, on the basis of color reproduction range information representing a color reproduction range of a designated device in a predetermined color space which is not dependent on the designated device,
   uses a predetermined conversion rule to specify a color range conversion condition for converting a color range of input color signals in the predetermined color space such that the color range of the input color signals will fall in the color reproduction range, and
   performs a color range conversion of the input color signals in accordance with the specified color range conversion condition;
   a control component that excludes from objects of the color range conversion by the color range conversion component a color value, of the input color signals, of which a position in the predetermined color space is outside the color reproduction range and which satisfies a predetermined condition; and
   a color conversion and clipping component that performs a conversion, into a color space which is dependent on the designated device, of color signals that have been subjected to the color range conversion by the color range conversion component and, after the color space conversion, applies clipping to the color value, of the input color signals, that falls outside the color reproduction range of the designated device in the color space dependent on the designated device, including rounding off such that the color value falls in the color reproduction range.

2. The color processing device of claim 1, wherein the control component excludes from objects of the color range conversion a color value of which a position in the predetermined color space is outside the color reproduction range and which satisfies, as the predetermined condition, a condition that a predetermined evaluation value representing a distance in the predetermined color space of the color value from an outer border of the color reproduction range of the designated device is less than or equal to a threshold value.

3. The color processing device of claim 2, wherein the predetermined evaluation value comprises at least one of
   an evaluation value representing a minimum distance between the color value that is an object of evaluation and the outer border of the color reproduction range of the designated device in the predetermined color space,
   an evaluation value representing a distance in the predetermined color space between the evaluation object color value and a position on the outer border of the color reproduction range of the designated device at which a color difference from the evaluation object color value is minimal, and
   an evaluation value representing a distance between the evaluation object color value and a provisional corresponding color value, the provisional corresponding color value having been found by applying the predetermined conversion rule to the evaluation object color value.

4. The color processing device of claim 1, wherein the predetermined condition comprises a condition that the color value is in a specific range of hues, which corresponds to a portion of the color reproduction range of the designated device in the predetermined color space at which an angle of inclination of an outer border surface of the color reproduction range with respect to a direction perpendicular to a brightness axis of the predetermined color space is less than or equal to a predetermined value.

5. A color processing method comprising:
   (a) on the basis of color reproduction range information representing a color reproduction range of a designated device in a predetermined color space which is not dependent on the designated device, performing a color range conversion of input color signals in accordance with a specified color range conversion condition, including using a predetermined conversion rule to specify the color range conversion condition for converting a color range of the input color signals in the predetermined color space such that the color range of the input color signals will fall in the color reproduction range;
   (b) excluding from objects of the color range conversion in (a) a color value, of the input color signals, of which a position in the predetermined color space is outside the color reproduction range and which satisfies a predetermined condition; and
   (c) performing a conversion, into a color space which is dependent on the designated device, of color signals that have been subjected to the color range conversion in (a) and,
   after the color space conversion, applying clipping to the color value, of the input color signals, that falls outside the color reproduction range of the designated device in the color space dependent on the designated device, including rounding off such that the color value falls in the color reproduction range.

6. The color processing method of claim 5, wherein (b) includes excluding from objects of the color range conversion a color value of which a position in the predetermined color space is outside the color reproduction range and which satisfies, as the predetermined condition, a condition that a predetermined evaluation value representing a distance in the predetermined color space of the color value from an outer border of the color reproduction range of the designated device is less than or equal to a threshold value.

7. The color processing method of claim 6, wherein the predetermined evaluation value comprises at least one of
an evaluation value representing a minimum distance between the color value that is an object of evaluation and the outer border of the color reproduction range of the designated device in the predetermined color space,
an evaluation value representing a distance in the predetermined color space between the evaluation object color value and a position on the outer border of the color reproduction range of the designated device at which a color difference from the evaluation object color value is minimal, and
an evaluation value representing a distance between the evaluation object color value and a provisional corresponding color value, the provisional corresponding color value having been found by applying the predetermined conversion rule to the evaluation object color value.

8. The color processing method of claim 5, wherein the predetermined condition comprises a condition that the color value is in a specific range of hues, which corresponds to a portion of the color reproduction range of the designated device in the predetermined color space at which an angle of inclination of an outer border surface of the color reproduction range with respect to a direction perpendicular to a brightness axis of the predetermined color space is less than or equal to a predetermined value.

9. A non-transitory storage medium readable by a computer, the storage medium storing a program of instructions executable by the computer to perform a function for color processing, the function comprising:
(a) on the basis of color reproduction range information representing a color reproduction range of a designated device in a predetermined color space which is not dependent on the designated device, performing a color range conversion of input color signals in accordance with a specified color range conversion condition, including using a predetermined conversion rule to specify the color range conversion condition for converting a color range of the input color signals in the predetermined color space such that the color range of the input color signals will fall in the color reproduction range;
(b) excluding from objects of the color range conversion in (a) a color value, of the input color signals, of which a position in the predetermined color space is outside the color reproduction range and which satisfies a predetermined condition; and
(c) performing a conversion, into a color space which is dependent on the designated device, of color signals that have been subjected to the color range conversion in (a) and,
after the color space conversion, applying clipping to the color value, of the input color signals, that falls outside the color reproduction range of the designated device in the color space dependent on the designated device, including rounding off such that the color value falls in the color reproduction range.

10. The non-transitory storage medium of claim 9, wherein (b) includes excluding from objects of the color range conversion a color value of which a position in the predetermined color space is outside the color reproduction range and which satisfies, as the predetermined condition, a condition that a predetermined evaluation value representing a distance in the predetermined color space of the color value from an outer border of the color reproduction range of the designated device is less than or equal to a threshold value.

11. The non-transitory storage medium of claim 10, wherein the predetermined evaluation value comprises at least one of
an evaluation value representing a minimum distance between the color value that is an object of evaluation and the outer border of the color reproduction range of the designated device in the predetermined color space,
an evaluation value representing a distance in the predetermined color space between the evaluation object color value and a position on the outer border of the color reproduction range of the designated device at which a color difference from the evaluation object color value is minimal, and
an evaluation value representing a distance between the evaluation object color value and a provisional corresponding color value, the provisional corresponding color value having been found by applying the predetermined conversion rule to the evaluation object color value.

12. The non-transitory storage medium of claim 9, wherein the predetermined condition comprises a condition that the color value is in a specific range of hues, which corresponds to a portion of the color reproduction range of the designated device in the predetermined color space at which an angle of inclination of an outer border surface of the color reproduction range with respect to a direction perpendicular to a brightness axis of the predetermined color space is less than or equal to a predetermined value.

* * * * *